United States Patent
Sakurai

(10) Patent No.: US 10,408,256 B2
(45) Date of Patent: Sep. 10, 2019

(54) HALF THRUST BEARING

(71) Applicant: DAIDO METAL COMPANY LTD., Nagoya (JP)

(72) Inventor: Shinichi Sakurai, Inuyama (JP)

(73) Assignee: DAIDO METAL COMPANY LTD., Nagoya (JP)

( * ) Notice: Subject to any disclaimer, the term of this patent is extended or adjusted under 35 U.S.C. 154(b) by 0 days.

(21) Appl. No.: 15/986,962

(22) Filed: May 23, 2018

(65) Prior Publication Data

US 2018/0355907 A1    Dec. 13, 2018

(30) Foreign Application Priority Data

Jun. 12, 2017    (JP) .................................. 2017-115160

(51) Int. Cl.
*F16C 9/02*         (2006.01)
*F16C 17/10*        (2006.01)
(Continued)

(52) U.S. Cl.
CPC .............. *F16C 9/02* (2013.01); *F02F 7/0053* (2013.01); *F16C 17/04* (2013.01); *F16C 17/047* (2013.01);
(Continued)

(58) Field of Classification Search
CPC ........ F16C 9/02; F16C 17/102; F16C 17/045; F16C 33/103; F16C 33/1065;
(Continued)

(56) References Cited

U.S. PATENT DOCUMENTS 5,192,136 A * 3/1993 Thompson ................ F16C 9/02
                                                384/123
6,149,310 A * 11/2000 Ono ...................... F02F 7/0053
                                                384/294

(Continued)

FOREIGN PATENT DOCUMENTS

| JP | 11201145 A | * | 7/1999 | ............ F02F 7/0053 |
| JP | H11-201145 A | | 7/1999 | |
| JP | 2013-019517 A | | 1/2013 | |
| JP | 2013-238277 A | | 11/2013 | |
| WO | WO-2014091207 A1 | * | 6/2014 | ................ F16C 9/02 |

OTHER PUBLICATIONS

Extended European Search Report issued in corresponding EP Application No. 18174126.5, dated Nov. 21, 2018, 7 pages.

*Primary Examiner* — Marcus Charles
(74) *Attorney, Agent, or Firm* — Snyder, Clark, Lesch & Chung, LLP

(57) ABSTRACT

A half thrust bearing includes a sliding surface for receiving an axial force of a crankshaft of an engine, and a rear surface on an opposite side thereto. The sliding surface includes a flat surface portion near a circumferentially central portion, and two inclined flat surface portions on both circumferential sides of the flat surface portion. The axial distance between the rear surface and the sliding surface is maximum at the flat surface portion. At any radial positions, the axial distance in each inclined flat surface portion is maximum on a circumferentially central portion side and is reduced toward a circumferential end portion of the half thrust bearing. Each inclined flat surface portion is arranged to form one constant thickness portion extending linearly from a radially inner end to a radially outer end at a circumferential angle of 45°.

7 Claims, 11 Drawing Sheets

(51) Int. Cl.
*F16C 33/10* (2006.01)
*F02F 7/00* (2006.01)
*F16C 43/02* (2006.01)
*F16C 17/04* (2006.01)
*F16C 33/04* (2006.01)
*F16C 9/03* (2006.01)

(52) U.S. Cl.
CPC .......... *F16C 17/102* (2013.01); *F16C 33/046* (2013.01); *F16C 33/103* (2013.01); *F16C 33/1075* (2013.01); *F16C 43/02* (2013.01); *F16C 9/03* (2013.01)

(58) Field of Classification Search
CPC .... F16C 33/1075; F16C 33/046; F16C 43/02; F16C 2226/76; F02F 7/0053
USPC ....... 384/123, 273, 275, 288, 291, 316, 397, 384/420
See application file for complete search history.

(56) References Cited

U.S. PATENT DOCUMENTS

| | | | |
|---|---|---|---|
| 6,481,895 B2 * | 11/2002 | Yang | F16C 9/02 384/294 |
| 6,511,226 B2 * | 1/2003 | Thompson | F16C 9/02 384/294 |
| 7,134,793 B2 * | 11/2006 | Thompson | F16C 9/02 384/294 |
| 7,354,199 B2 * | 4/2008 | Welch | F16C 9/00 384/275 |
| 9,016,948 B2 * | 4/2015 | Patel | F16C 43/02 384/420 |
| 9,618,034 B2 * | 4/2017 | Carter | F16C 9/02 |
| 2003/0128902 A1 * | 7/2003 | Kennedy | F16C 9/02 384/275 |
| 2014/0233874 A1 * | 8/2014 | Tanaka | F16C 33/046 384/294 |
| 2016/0032961 A1 | 2/2016 | Tanaka et al. | |
| 2016/0169277 A1 | 6/2016 | Tanaka et al. | |

* cited by examiner

HALF THRUST BEARING

BACKGROUND OF THE INVENTION

(1) Field of the Invention

The present invention relates to a thrust bearing which receives an axial force of a crankshaft of an internal combustion engine.

(2) Description of Related Art

A crankshaft of an internal combustion engine is rotatably supported, at its journal portion, in a lower part of a cylinder block of the internal combustion engine via a main bearing which is configured by combining a pair of half bearings into a cylindrical shape.

One or both of the pair of half bearings is used in combination with a half thrust bearing which receives an axial force of the crankshaft. The half thrust bearing is provided at one or both of axial end surfaces of the half bearing.

The half thrust bearing receives an axial force generated in the crankshaft. That is, the half thrust bearing is provided for the purpose of bearing the axial force inputted to the crankshaft when the crankshaft is connected to a transmission via a clutch, for example.

On a sliding surface side of the half thrust bearing near both circumferential ends thereof, thrust reliefs are formed so that a bearing member becomes thinner toward the respective circumferential end surfaces. In general, the thrust relief is formed so that a length from the circumferential end surface to the sliding surface of the half thrust bearing, and a depth at the circumferential end surface are constant irrespective of the position in a radial direction. The thrust relief is formed in order to absorb misalignment of the end surfaces of a pair of half thrust bearings when the half thrust bearings are mounted on a split type bearing housing (see FIG. 10 of JP H11-201145 A).

Further, conventionally, there is also proposed a technique in which, in consideration of the deflection deformation of a crankshaft during operation of an internal combustion engine, a crowning surface having a curved surface shape is provided on at least an outer diameter side of a sliding surface of the half thrust bearing, thereby reducing the local contact stress between the sliding surface of the half thrust bearing and the crankshaft (JP 2013-019517 A).

In addition, there is also proposed a technique in which an inclined surface (thrust relief) which extends from a circumferential end portion of the half thrust bearing by a length of an approximate half of the height of a top portion (outer diameter end at a circumferential center of the half thrust bearing) is formed on a sliding surface of the half thrust bearing, thereby reducing an inclined angle of the inclined surface relative to the sliding surface (see JP 2013-238277 A).

BRIEF SUMMARY OF THE INVENTION

In recent years, crankshafts have been reduced in diameter for reducing the weights of internal combustion engines, so that the rigidity of the crankshaft becomes lower than that of the conventional crankshaft. Accordingly, the deflection of the crankshaft tends to be easily generated during operation of the internal combustion engine, and the vibration of the crankshaft tends to become large. Accordingly, a thrust collar surface of the crankshaft slidingly comes into contact with the sliding surface of the half thrust bearing while being inclined thereto, and the inclined direction thereof changes in accordance with rotation of the crankshaft. As a result, the sliding surface near both circumferential end portions of the half thrust bearing comes into direct contact with the thrust collar surface of the crankshaft, and thus damage (seizure) becomes easily caused.

Further, when a pair of half thrust bearings are assembled to respective end portions in the axial direction of a main bearing constituted by a pair of half bearings, if positions of end surfaces of the pair of half thrust bearings is misaligned when being assembled into a split type bearing housing, a clearance (or gap) between a sliding surface of one of the half thrust bearings and the thrust collar surface of the crankshaft becomes larger than a clearance between the other half thrust bearing and the thrust collar surface of the crankshaft. Alternatively, when only one half thrust bearing is assembled to respective end portions in the axial direction of the main bearing, a large clearance is formed between a side surface of the split type bearing housing on which the half thrust bearing is not provided and the thrust collar surface of the crankshaft. If the internal combustion engine is operated and the deflection of the crankshaft is generated in a state where such a clearance is formed, the thrust collar surface of the crankshaft is further inclined toward the formed clearance side.

If the crankshaft rotates in such a state of being largely inclined toward the clearance side, an inclination of the thrust collar surface relative to the sliding surface of the half thrust bearing in a plane containing both circumferential end surfaces of the half thrust bearing becomes larger. In addition, in the plane containing the both circumferential end surfaces of the half thrust bearing, this inclination of the thrust collar surface repeats an inclined state (a) in which the sliding surface near the circumferential end portion of the half thrust bearing that is located on a backward side in the rotation direction of the crankshaft comes into contact with the thrust collar surface while the sliding surface near the circumferential end portion located on a forward side in the rotation direction of the crankshaft is apart from the thrust collar surface, and an inclined state (b) in which the sliding surface near the circumferential end portion of the half thrust bearing on the forward side in the rotation direction of the crankshaft comes into contact with the thrust collar surface while the sliding surface near the circumferential end portion on the backward side in the rotation direction of the crankshaft is apart from the thrust collar surface, in accordance with the rotation of the crankshaft. Since only the sliding surface near both circumferential end portions of the half thrust bearing comes into direct contact with the thrust collar surface of the crankshaft, damage (seizure) easily occurs there.

Furthermore, when the crankshaft rotates at a high speed, vibration of the crankshaft in the axial direction becomes large, and a circumferentially central portion of the sliding surface of the half thrust bearing comes into contact with the thrust collar surface in the course of shifting the inclination of the thrust collar surface from the inclined state (a) to the inclined state (b), so that friction loss becomes large.

When the inclination of the thrust collar surface toward the clearance side is large due to the deflection of the crankshaft, and thus the inclination of the thrust collar surface in a plane containing both circumferential end surfaces of the half thrust bearing is large, even if the techniques disclosed in JP 2013-019517 A and JP 2013-238277 A are employed, it has been difficult to prevent the sliding surface only near both circumferential end portions of the half thrust bearing from always being in contact with the thrust collar surface of the crankshaft.

Accordingly, an object of the present invention is to provide a half thrust bearing in which the damage (seizure) hardly occurs during operation of the internal combustion engine and the friction loss is small.

In order to achieve the object described above, according to one aspect of the present invention, there is provided a half thrust bearing for receiving an axial force of a crankshaft of an internal combustion engine, the half thrust bearing having a semi-annular shape and including a sliding surface for receiving the axial force, and a rear surface on an opposite side of the sliding surface, and the half thrust bearing defining a reference plane on a rear surface side that is perpendicular to an axial direction, wherein the sliding surface includes a flat surface portion which extends in parallel with the reference plane from a radially inner end of the half thrust bearing to a radially outer end thereof, and two inclined flat surface portions formed on both sides of the flat surface portion in a circumferential direction, an axial distance between the reference plane and the sliding surface is maximum in the flat surface portion, at any radial positions, the axial distance in each inclined flat surface portion is maximum at a circumferential end of the inclined flat surface portion on a circumferentially central portion side of the half thrust bearing and is reduced toward a circumferential end portion of the half thrust bearing, each inclined flat surface portion is arranged to form one constant thickness portion which extends linearly from the radially inner end to the radially outer end of the half thrust bearing in an area between central angles of 35° and 55° from the circumferential end portion toward the circumferentially central portion side of the half thrust bearing, the axial distance being constant in the constant thickness portion, at any circumferential positions, the axial distance in each inclined flat surface portion is maximum at the radially inner end and is reduced toward the radially outer end in a region of the inclined flat surface portion on a circumferential end portion side of the constant thickness portion, and is minimum at the radially inner end and is increased toward the radially outer end in a region of the inclined flat surface portion on the circumferentially central portion side of the constant thickness portion, and the flat surface portion has a circumferential length which extends over a central angle of 5° or more and 35° or less, at any radial positions of the half thrust bearing.

In any cross-sections which are parallel with a plane containing both circumferential end surfaces of the half thrust bearing, the axial distance in each inclined flat surface portion is minimum at an outer peripheral side end of the half thrust bearing and is increased toward the circumferentially central portion side.

The rear surface of the half thrust bearing may be flat, and be positioned in the reference plane.

Further, the flat surface portion may include the circumferentially central portion of the half thrust bearing.

Furthermore, the circumferential length of the flat surface portion may be minimum at the radially inner end of the half thrust bearing and be gradually increased toward the radially outer end thereof, or may be minimum at the radially outer end of the half thrust bearing and be gradually increased toward the radially inner end thereof.

Still further, when the half thrust bearing is seen from a direction perpendicular to both circumferential end surfaces of the half thrust bearing, an outline of each inclined flat surface portion of the sliding surface may be configured by a curved line.

Still further, a difference between the axial distance in the flat surface portion and the axial distance in both circumferential end portions at the radially outer ends of the half thrust bearing may be 50 to 800 μm.

The two inclined flat surface portions constituting the sliding surface may be line-symmetric with respect to a center line extending through the circumferentially central portion.

The constant thickness portion may be formed at a central angle of 45° from each circumferential end surface toward the circumferentially central portion.

Here, the crankshaft is a member including a journal portion, a crankpin portion, and a crank arm portion. While the half thrust bearing is a member having a shape obtained by dividing an annular shape into approximately halves, it is not intended to be strictly half.

Effect of Invention

According to the half thrust bearing including the configuration described above, even when an inclined angle of the thrust collar surface of the crankshaft relative to the sliding surface of the half thrust bearing becomes large due to the deflection of the crankshaft during the operation of the internal combustion engine, a contact position between the sliding surface and the thrust collar surface is successively moved in the circumferential direction in accordance with the rotation of the crankshaft, so that the sliding surface near both circumferential end portions of the half thrust bearing is prevented from coming into contact with the thrust collar surface of the crankshaft all the time, and damage of the sliding surface of the half thrust bearing hardly occurs.

In addition, in the thrust bearing of the present invention, the oil flowing in a clearance (gap) between the inclined flat surface and the thrust collar surface in the region on the circumferentially central portion side of the constant thickness portion M during the operation of the internal combustion engine becomes hardly discharged to a radially outer side of the half thrust bearing, and therefore an effective wedge oil film is easily formed in the flat surface portion near the circumferentially central portion of the sliding surface. As a result, the thrust collar surface is prevented from coming into contact with the sliding surface in the circumferentially central portion of the half thrust bearing, so that the friction loss becomes small.

DETAILED DESCRIPTION OF THE INVENTION

Hereinafter, embodiments of the present invention will be described with reference to the drawings.

Embodiment 1

(General Configuration of Bearing Device)

Figure 1:
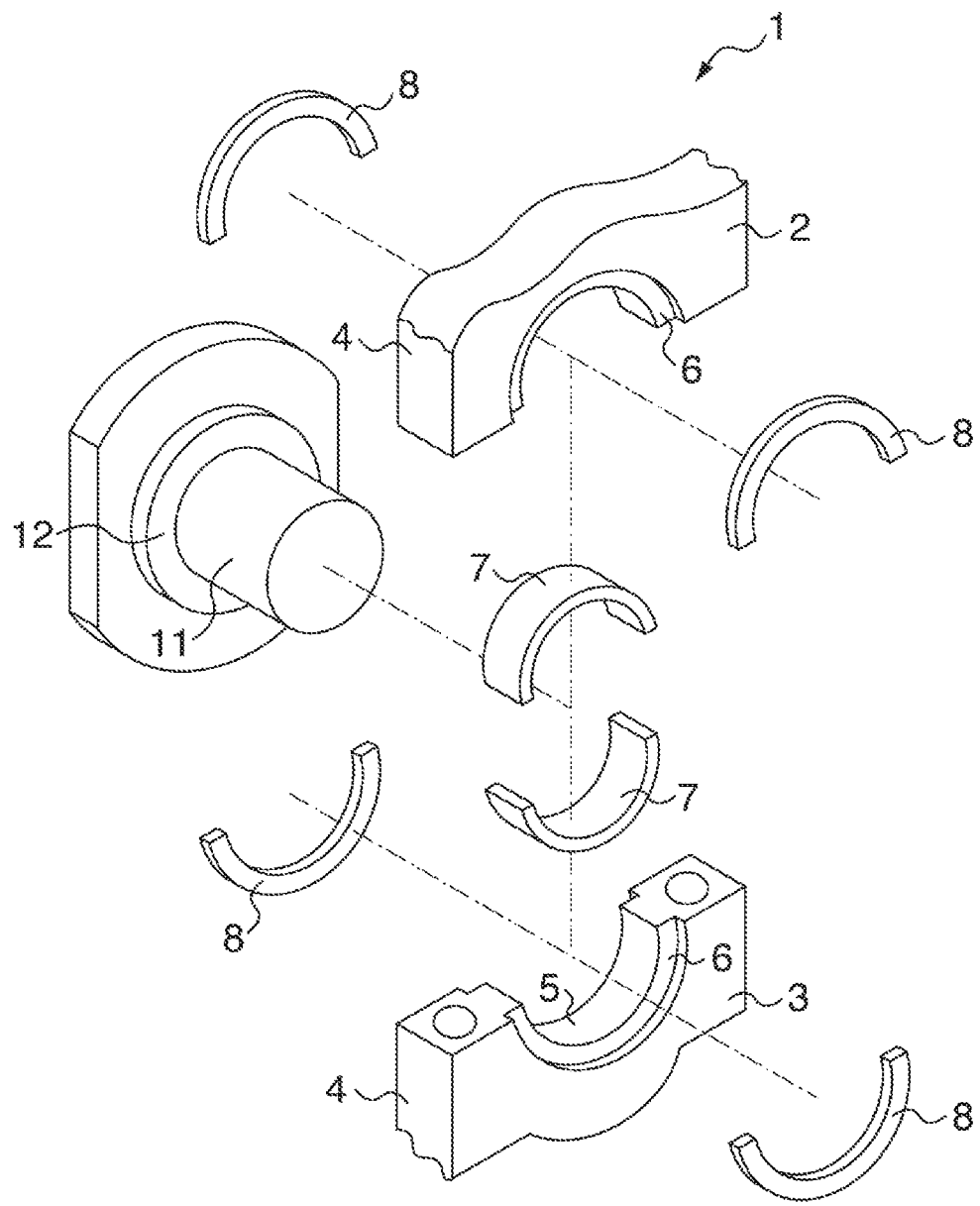
FIG. 1 is an exploded perspective view of a bearing device.
Figure 8:
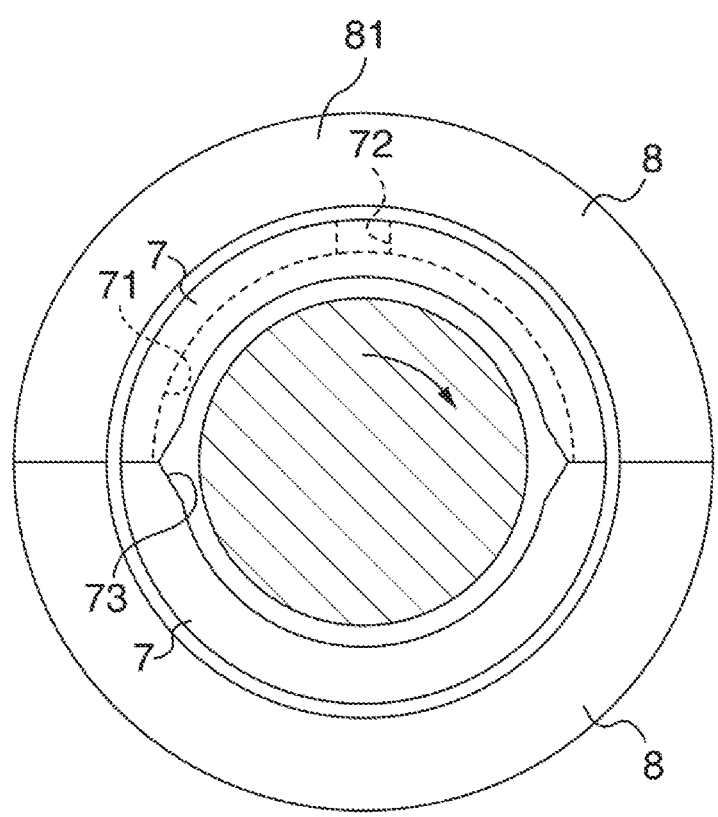
FIG. 8 is a front view of half bearings and a thrust bearing.
Figure 9:
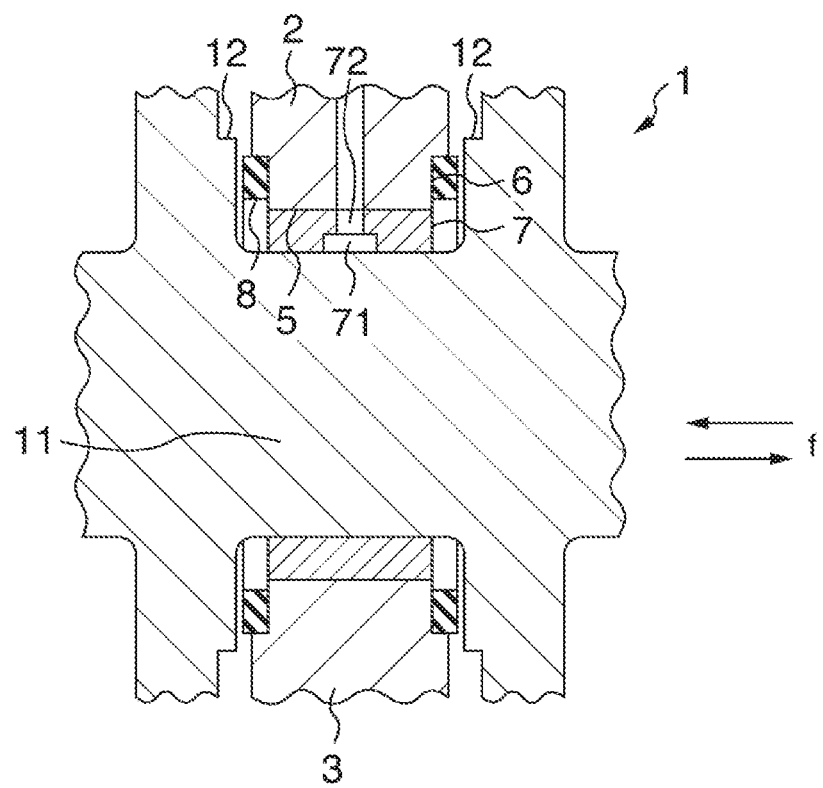
FIG. 9 is a cross-sectional view of the bearing device.

First, a description will be given for a general configuration of a bearing device 1, using FIGS. 1, 8, and 9. As shown in FIGS. 1, 8, and 9, a bearing housing 4 configured by attaching a bearing cap 3 to a lower part of a cylinder block 2 has a bearing hole (holding hole) 5 which is a circular hole penetrating between both side surfaces of the cylinder block 2 and the bearing cap 3. The side surfaces have seats 6 and 6, which are annular recesses, on the periphery of the bearing hole 5. Half bearings 7 and 7 are combined into a cylindrical shape and fitted in the bearing hole 5. The half bearings 7 and 7 rotatably support a journal portion 11 of a crankshaft. Half thrust bearings 8 and 8 are combined into an annular shape and fitted in the seats 6 and 6. The half thrust bearings 8 and 8 receive an axial force f (see FIG. 9) of the crankshaft via a thrust collar surface 12. It is to be noted that FIG. 8 illustrates the half thrust bearings 8 which do not have the configuration of the present invention.

Figure 10:
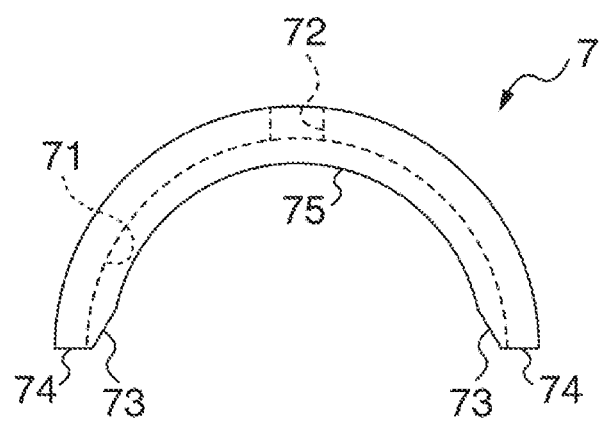
FIG. 10 is a front view of an upper half bearing in FIG. 8.
Figure 11:
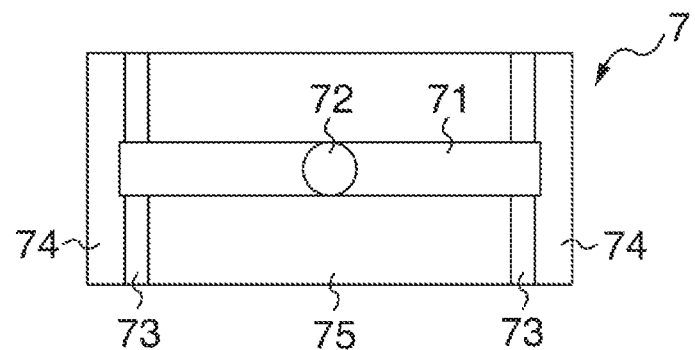
FIG. 11 is a bottom view of the half bearing in FIG. 10 seen from the inner side in the radial direction.

As shown in FIG. 8, a lubrication oil groove 71 is formed on an inner peripheral surface of the (upper) half bearing 7 of the half bearings 7 and 7 constituting a main bearing that is provided on a cylinder block 2 side, and a through hole 72 is formed to penetrate the half bearing 7 from the lubrication oil groove 71 to an outer peripheral surface (also see FIGS. 10 and 11). The lubrication oil groove 71 may be formed on both of the upper and lower half bearings. Further, each half bearing 7 has crush reliefs 73 on a sliding surface 75 adjacent to both circumferential end surfaces 74.

(Configuration of Half Thrust Bearing)

Next, the configuration of the half thrust bearings 8 of embodiment 1 will be described using FIGS. 2 to 7. Each half thrust bearing 8 of the embodiment is a semi-annular shaped flat plate formed from a bimetal which is obtained by bonding a thin bearing alloy layer to a back metal layer made of steel. Each half thrust bearing 8 includes a sliding surface 81 (bearing surface) facing in an axial direction, and the sliding surface 81 is configured by a bearing alloy layer.

Figure 2:
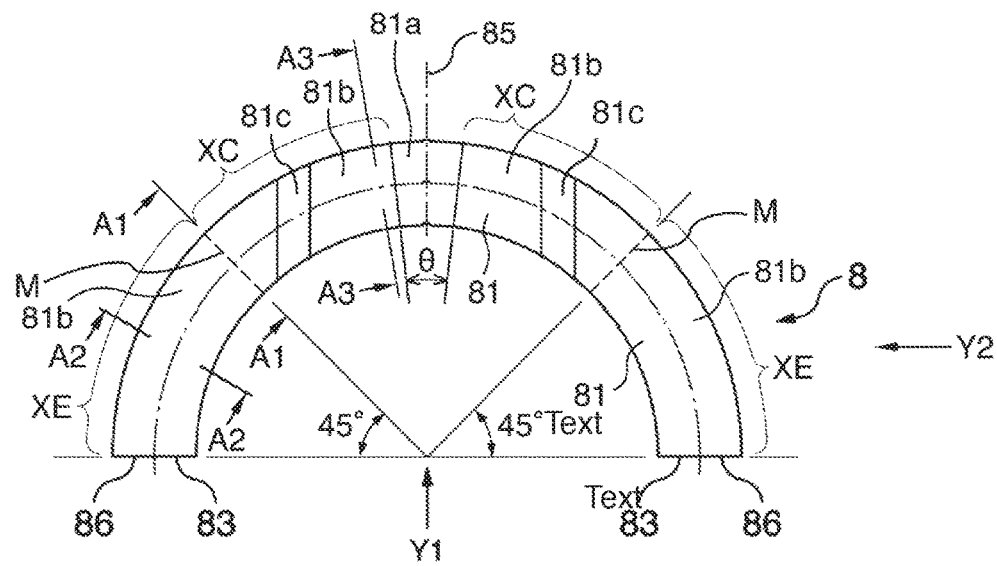
FIG. 2 is a front view of a half thrust bearing of embodiment 1.
Figure 3:
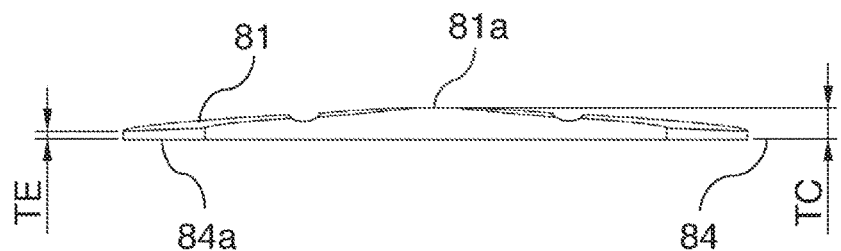
FIG. 3 is a side view of the half thrust bearing in FIG. 2 seen in the direction of arrow Y1.
Figure 4:
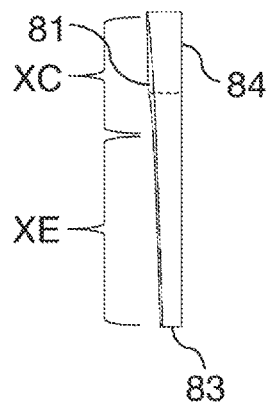
FIG. 4 is a side view of the half thrust bearing in FIG. 2 seen in the direction of arrow Y2.
Figure 5:
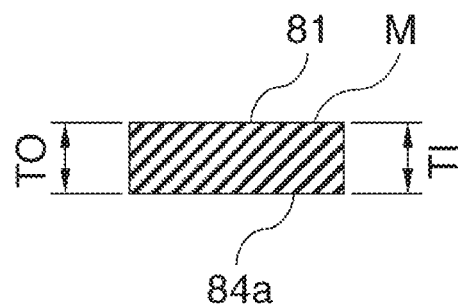
FIG. 5 is a cross-sectional view of the half thrust bearing in FIG. 2 taken along line A1-A1.
Figure 6:
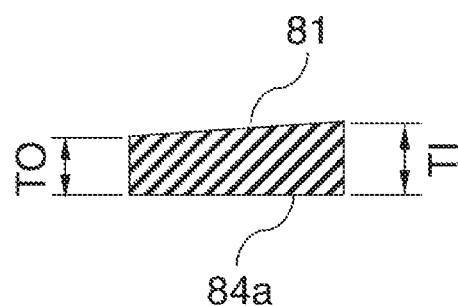
FIG. 6 is a cross-sectional view of the half thrust bearing in FIG. 2 taken along line A2-A2.

Each half thrust bearing 8 defines a reference plane 84 perpendicular to the axial direction, and includes a rear surface 84a in this reference plane 84 that is adapted to be arranged on the seat 6 of the cylinder block 2 and is a substantially flat shape (see FIG. 3). In addition, each half thrust bearing 8 includes the sliding surface 81 apart from the reference plane 84 (the rear surface 84a) in the axial direction. The sliding surface 81 is adapted to receive the axial force f (see FIG. 9) via the thrust collar surface 12 of the crankshaft. More specifically, the sliding surface 81 includes one flat surface portion 81a which includes a circumferentially central portion 85 of the half thrust bearing 8 and is in parallel with the reference plane 84, and two inclined flat surface portions 81b which are provided on both sides (opposite sides) of the flat surface portion 81a in the circumferential direction. At any radial positions of the half thrust bearing 8, an axial distance (thickness) from the reference plane 84 to the sliding surface 81 is maximum in the flat surface portion 81a, and is reduced in the inclined flat surface portions 81b from the sides of the flat surface portion 81a toward both circumferential end portions of the half thrust bearing. Accordingly, it would be understood that also at a radially central position (a circumferential dot-and-dash line in FIG. 2) of the half thrust bearing 8, for example, the axial distance from the reference plane 84 to the sliding surface 81 is maximum (TC) in the flat surface portion 81a, and minimum (TE) at both circumferential end portions 86.

It is to be noted that in order to improve retainability of the lubrication oil, each inclined flat surface portion 81b may include an oil groove 81c extending in the radial direction.

Further, as shown in FIG. 2, the flat surface portion 81a has a front shape which is surrounded by an inner peripheral portion defined by a circular arc at a radially inner end of the half thrust bearing 8, an outer peripheral portion defined by a circular arc at a radially outer end thereof, and two straight lines positioned on both circumferential sides thereof. Each of the inner peripheral portion and the outer peripheral portion has a circumferential length extending over a central angle θ. Each of the inner peripheral portion and the outer peripheral portion is preferably formed so as to have the circumferential length extending over a central angle of 5° to 35°.

In the embodiment, the axial distance between the reference plane 84 (the rear surface 84a) and the sliding surface 81 corresponds to a bearing wall thickness T of the half thrust bearing 8. Further, in the embodiment, one and single constant thickness portion M where the bearing wall thickness is constant between the radially outer end and the radially inner end is formed between each circumferential end portion 86 and an end of the inclined flat surface portion 81b on the circumferentially central portion 85 side (see FIGS. 2 and 5). The constant thickness portion M is one and single cross-sectional portion (see FIG. 5) which extends from the radially outer end to the radially inner end in each inclined flat surface portion 81b with a constant bearing wall thickness T, and appears as a straight line on the inclined flat surface portion 81b of the half thrust bearing 8 that extends between the radially outer end and the radially inner end (see FIG. 2). More specifically, the constant thickness portion M is arranged in a location at a central angle of 45° from each circumferential end portion 86 toward the circumferentially central portion 85 of the half thrust bearing 8. In a region XE on the circumferential end portion 86 side of the constant thickness portion M, the bearing wall thickness is maximum at the radially inner end (thickness TI) and is reduced toward the radially outer end (thickness TO) at any circumferential positions (see FIG. 6), whereas in a region XC on the circumferentially central portion 85 side of the constant thickness portion M, the bearing wall thickness is minimum at the radially inner end (thickness TI) and is increased toward the radially outer end (thickness TO) at any circumferential positions (see FIG. 7).

In other words, the inclined flat surface portion 81b according to the above configuration consists of a flat surface which is inclined relative to the rear surface 84 so that the bearing wall thickness is reduced from the radially outer end at the circumferential end on the circumferentially central portion 85 side of the half thrust bearing toward the radially outer end at each of both circumferential end portions. Accordingly, in both region XC on the circumferentially central portion 85 side of the contact thickness portion M and region XE on the circumferential end portion 86 side of the contact thickness portion M, the bearing wall thickness is minimum at the outer peripheral side end of the half thrust bearing and is increased toward the circumferentially central portion 85 side in any cross-section which is parallel with a plane containing both circumferential end surfaces 83, as understood by FIG. 4.

It is to be noted that in a portion of the inclined flat surface portion 81b where the oil groove 81c is formed, the half thrust bearing 8 is formed such that an axial direction distance from the rear surface 84a to an imaginary sliding surface (extension surface of the inclined flat surface portion 81b), which must exist when the oil groove 81c is not formed, satisfies the abovementioned relationship.

The constant thickness portion M may be arranged without being limited to a location at a central angle of 45° from each circumferential end portion 86 of the half thrust bearing 8 toward the circumferentially central portion 85. In other words, one constant thickness portion M may be arranged in an area between central angles of 35° and 55° from each circumferential end portion 86 toward the circumferentially central portion 85.

The half thrust bearing 8 is formed such that the bearing wall thickness TE at both circumferential end portions of the half thrust bearing 8 is smaller than the bearing wall thickness TC in the flat surface portion 81a as described above (see FIG. 3). Accordingly, seen from a direction perpendicular to a plane containing both circumferential end surfaces of the half thrust bearing 8, the sliding surface 81 of the half thrust bearing 8 has an outline of a convex shape in which the flat surface portion 81a is protruded most (see FIG. 3). More specifically, when the half thrust bearings 8 are used for a small-sized crankshaft (including an journal portion having a diameter of about 30 to 100 mm) of an internal combustion engine for a passenger vehicle and the like, a difference between a bearing wall thickness in the flat surface portion 81a of the half thrust bearing 8 and a bearing wall thickness at both circumferential end portions thereof is, for example, 50 to 800 μm, and more preferably, is 200 to 400 μm. However, these sizes are merely examples, and the difference in bearing wall thickness is not limited to this size range.

(Operation)

Next, the operation of conventional half thrust bearings 8 will be described using FIGS. 8, 9, and 12.

In general, the half bearings 7 are arranged to be concentric with the half thrust bearings 8, so that a plane containing both circumferential end surfaces 74 of the half bearings 7 constituting the main bearing substantially corresponds to a plane containing both circumferential end surfaces 83 of the half thrust bearing 8.

During operation of an internal combustion engine, deflection (deflection in the axial direction) of a crankshaft is generated particularly in the case of the crankshaft in which the diameter is reduced for reducing the weight of the internal combustion engine so that the rigidity is lower than that of the conventional crankshaft, and therefore the vibration of the crankshaft becomes large. This large vibration periodically generates the axial force f in the crankshaft toward the sliding surface 81 of the half thrust bearing 8. The sliding surface 81 of the half thrust bearing 8 receives this axial force f.

Figure 12:
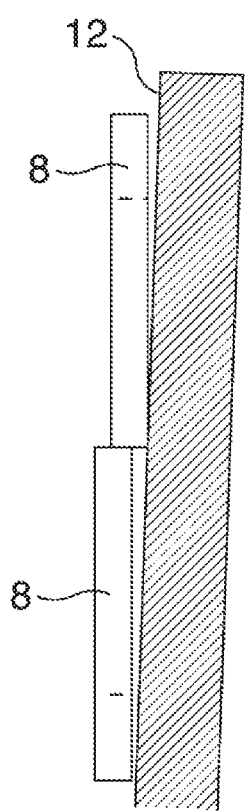
FIG. 12 is a cross-sectional view illustrating a contact state between a thrust collar surface and a pair of half thrust bearings during operation.
Figure 13A:
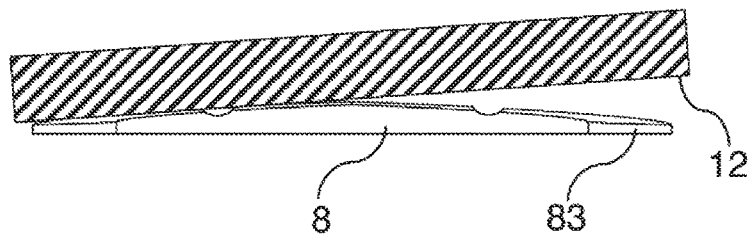
FIG. 13A is a view illustrating an inclination of the thrust collar surface relative to the sliding surface during operation seen from both circumferential end surfaces side.
Figure 13B:
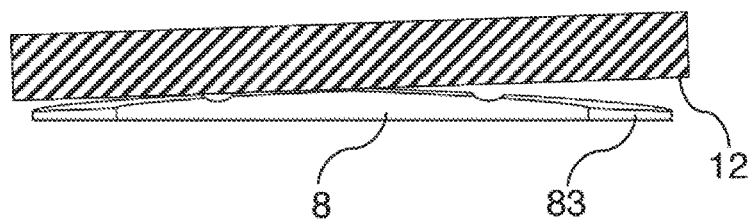
FIG. 13B is a view illustrating an inclination of the thrust collar surface relative to the sliding surface during operation seen from both circumferential end surfaces side.
Figure 13C:
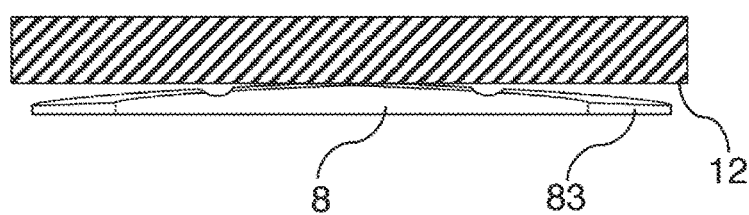
FIG. 13C is a view illustrating an inclination of the thrust collar surface relative to the sliding surface during operation seen from both circumferential end surfaces side.
Figure 13D:
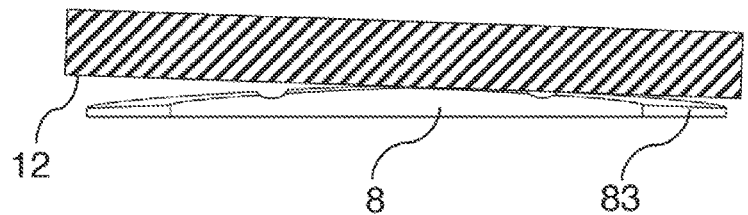
FIG. 13D is a view illustrating an inclination of the thrust collar surface relative to the sliding surface during operation seen from both circumferential end surfaces side.
Figure 13E:
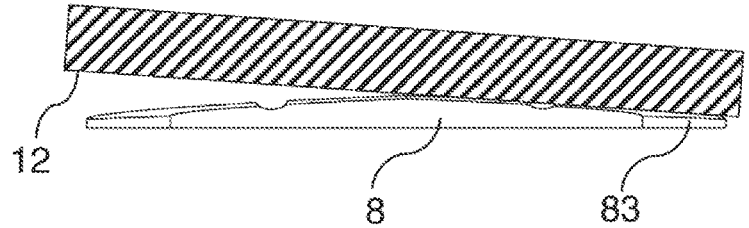
FIG. 13E is a view illustrating an inclination of the thrust collar surface relative to the sliding surface during operation seen from both circumferential end surfaces side.
Figure 14A:
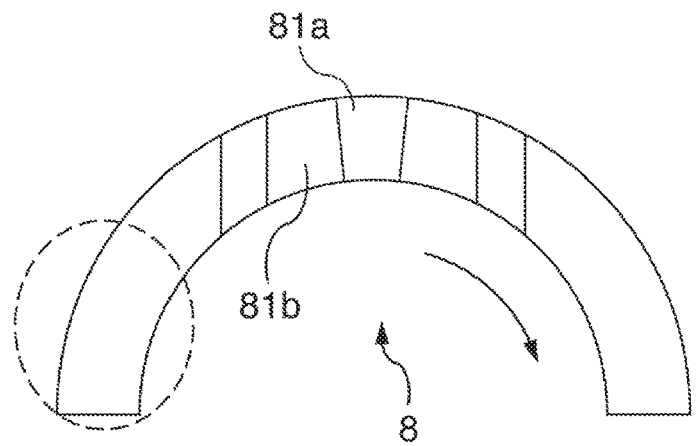
FIG. 14A is a view corresponding to FIG. 13A and illustrating a contact position between the sliding surface and the thrust collar surface when the sliding surface is seen from the front side.
Figure 14B:
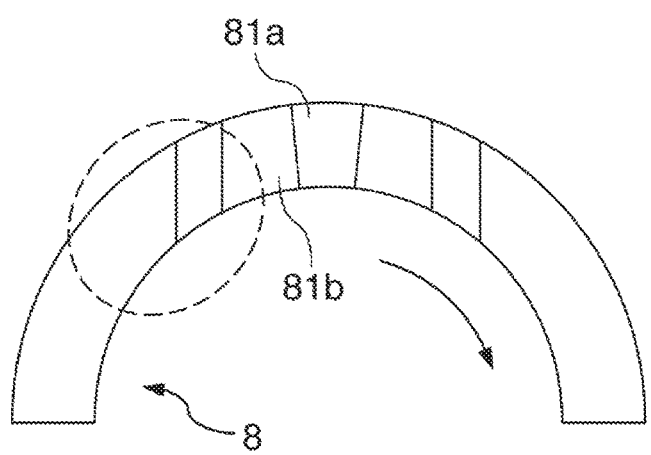
FIG. 14B is a view corresponding to FIG. 13B and illustrating a contact position between the sliding surface and the thrust collar surface when the sliding surface is seen from the front side.
Figure 14C:
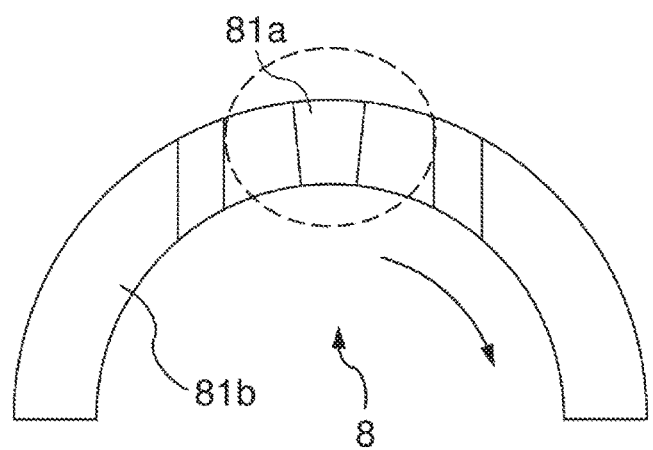
FIG. 14C is a view corresponding to FIG. 13C and illustrating a contact position between the sliding surface and the thrust collar surface when the sliding surface is seen from the front side.
Figure 14D:
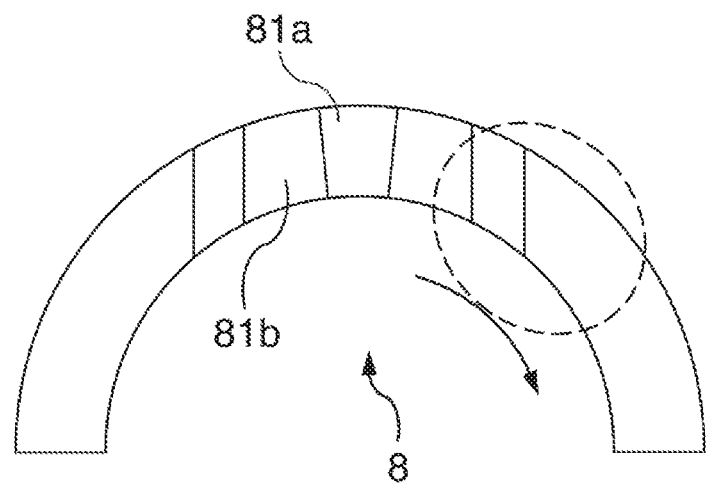
FIG. 14D is a view corresponding to FIG. 13D and illustrating a contact position between the sliding surface and the thrust collar surface when the sliding surface is seen from the front side.
Figure 14E:
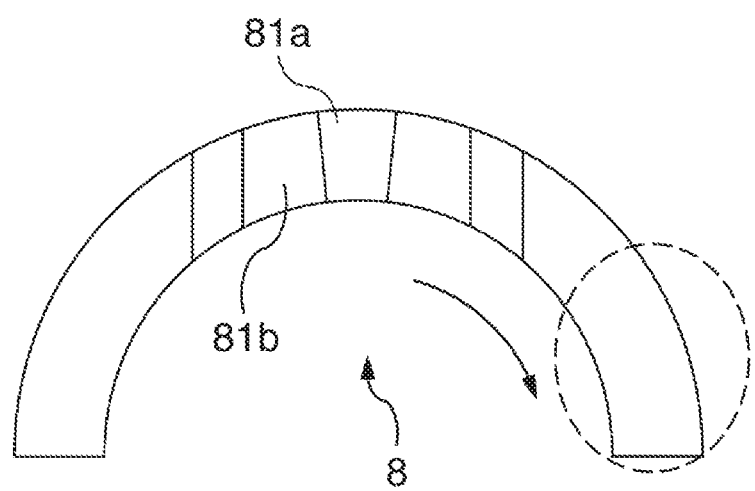
FIG. 14E is a view corresponding to FIG. 13E and illustrating a contact position between the sliding surface and the thrust collar surface when the sliding surface is seen from the front side.

When the pair of half thrust bearings 8 and 8 are attached to respective ends in the axial direction of the main bearing constituted by the pair of half bearings 7 and 7, if positions of end surfaces 83 and 83 of the pair of the half thrust bearings 8 and 8 mounted on the split type bearing housing 4 are not aligned in the axial direction, a clearance (gap) between the sliding surface 81 of one of the half thrust bearings 8 and the thrust collar surface 12 of the crankshaft becomes larger than a clearance between the sliding surface 81 of the other half thrust bearing 8 and the thrust collar surface 12 (see FIG. 12). Alternatively, when only one half thrust bearing 8 is attached to the respective ends in the axial direction of the main bearing, a large clearance is formed between a side surface of the split type bearing housing 4 on which the half thrust bearing 8 is not provided, and the thrust collar surface 12 of the crankshaft. If the internal combustion engine is operated and the deflection of the crankshaft is generated in a state where such a clearance is formed, the thrust collar surface 12 of the crankshaft is further inclined toward the large clearance side. If the crankshaft rotates in such a state of being largely inclined toward the clearance side, conventionally, an inclination of the thrust collar surface 12 relative to the half thrust bearing 8 becomes larger in a plane containing both circumferential end surfaces 83 of the half thrust bearing 8, and only the sliding surface 81 near both circumferential end portions of the half thrust bearing 8 comes into direct contact with the thrust collar surface 12 of the crankshaft all the time, so that damage (seizure) easily occurs as described above.

More specifically, when the half thrust bearing 8 is seen from the direction perpendicular to the plane containing both circumferential end surfaces 83, the thrust collar surface 12 of the crankshaft is in contact with (1) only the sliding surface 81 near the circumferential end portion of the half thrust bearing 8 on the back side of the rotation direction of the crankshaft after the state where the thrust collar surface 12 is inclined toward the circumferential end portion side of the half thrust bearing 8 on the rotation direction backward side of the crankshaft until the thrust collar surface 12 becomes in parallel with the sliding surface 81 of the half thrust bearing 8, and with (2) only the sliding surface 81 near the circumferential end portion of the half thrust bearing 8 on the rotation direction forward side of the crankshaft immediately after the state where the thrust collar surface 12 is in parallel with the sliding surface 81 until the thrust collar surface 12 is inclined toward the circumferential end surface side of the half thrust bearing 8 on the rotation direction forward side of the crankshaft.

Here, as described in JP 2013-19517 A, even when a crowning surface configured by a curved surface is provided on an outer diameter side of a sliding surface of a half thrust bearing, if the half thrust bearing 8 is formed not in such a manner that an axial distance from the reference plane 84 to the sliding surface 81 is maximum near the circumferentially central portion at any radial positions, that is, when the half thrust bearing 8 is seen from a direction perpendicular to a plane containing both circumferential end surfaces 83, if the sliding surface 81 of the half thrust bearing 8 does not have an outline of a convex shape in which the flat surface portion 81a is protruded most like the present application, the sliding surface 81 near the circumferential end portion of the half thrust bearing 8 particularly comes into direct contact with the thrust collar surface 12 of the crankshaft for the reason described above, so that damage easily occurs.

Alternatively, as described in JP 2013-238277 A, even if an inclined surface (thrust relief) which extends from a circumferential end portion of a half thrust bearing by a length which is an approximate half of the height of a top portion is formed on a sliding surface of the half thrust bearing, thereby reducing an inclined angle of the inclined surface relative to the sliding surface, in the case that the sliding surface 81 of the half thrust bearing 8 does not have an outline of a convex shape in which the flat surface portion 81a is protruded most like the present application, seen from the direction perpendicular to the plane containing both circumferential end surfaces 83 of the half thrust bearing 8, the sliding surface 81 (inclined surface) near the circumferential end portion of the half thrust bearing 8 particularly comes into direct contact with the thrust collar surface 12 of the crankshaft also for the reason described above, so that damage easily occurs.

In addition, in the half thrust bearing described in JP 2013-238277 A, the bearing wall thickness at the inclined surface is larger at a radially outer end of the thrust bearing than that at a radially inner end thereof, except for a circumferential end portion of the half thrust bearing, so that the sliding surface (inclined surface) near the circumferential end portion of the half thrust bearing, particularly at the outer diameter side, comes into direct contact with the thrust collar surface 12 of the crankshaft, and damage more easily occurs.

As described above, when the half thrust bearing 8 is seen from the direction perpendicular to the plane containing both circumferential end surfaces 83, if the sliding surface 81 of the half thrust bearing 8 has an outline which is protruded most only in the circumferentially central portion 85, during the transition period from the state where the thrust collar surface 12 of the crankshaft is inclined toward a circumferential end portion side of the half thrust bearing 8 on the rotation direction backward side of the crankshaft to the state where the thrust collar surface 12 is inclined toward a circumferential end surface side of the half thrust bearing 8 on the rotation direction forward side of the crankshaft, the circumferentially central portion 85 of the sliding surface 81 of the half thrust bearing 8 comes into contact with the thrust collar surface 12 due to the axial vibration of the crankshaft at the moment when the thrust collar surface 12 of the crankshaft becomes in parallel with the sliding surface 81 of the half thrust bearing 8, so that friction loss becomes large.

(Effect)

Next, an effect of the half thrust bearing 8 of this embodiment will be described using FIGS. 13A to 14E.

FIGS. 13A to 14E sequentially illustrate changes of the inclination of the thrust collar surface 12 relative to the sliding surface 81 during operation when the half thrust bearing 8 is seen from the direction perpendicular to the plane containing both circumferential end surfaces 83 of the half thrust bearing 8 (in other words, in a plane containing both circumferential end surfaces 83), and FIGS. 14A to 14E illustrate changes of the contact position of the sliding surface 81 with the thrust collar surface 12 corresponding to FIGS. 13A to 13E when the sliding surface 81 of the half thrust bearing 8 is seen from the front side. A dashed line circle in each of FIGS. 14A to 14E illustrates a contact portion (position on the sliding surface that receives load the most due to the contact) between the sliding surface 81 of the half thrust bearing 8 and the thrust collar surface 12. For example, from FIG. 13B and FIG. 14B corresponding to FIG. 13B, it would be understood that after the contact portion between the sliding surface 81 and the thrust collar surface 12 is apart from the vicinity of the circumferential end portion shown in FIG. 14A, until the thrust collar surface 12 reaches a circumferentially central portion shown in FIG. 14C, the thrust collar surface 12 is still inclined toward the sliding surface 81 in the plane containing both circumferential end surfaces 83.

The half thrust bearing 8 of the embodiment is configured such that the sliding surface 81 includes the flat surface portion 81a in parallel with the reference plane 84 near the circumferentially central portion, and an axial distance T from the rear surface 84a (reference plane 84) to the sliding surface 81 is maximum at the flat surface portion 81a at any radial positions of the half thrust bearing 8, and is reduced in the inclined flat surface portions 81b from the side of the flat surface portion 81a toward both circumferential end portions. Further, the one and single constant thickness portion M in which the axial distance is constant between the radially outer end and the radially inner end is formed between each circumferential end surface 83 and the circumferentially central portion 85, and the constant thickness portion M is arranged at a central angles of 45° from each circumferential end portion toward the circumferentially central portion of the half thrust bearing. At any circumferential positions, the axial distance (or thickness) in each inclined flat surface portion 81*b* is maximum (thickness TI) at the radially inner end and is reduced toward the radially outer end (thickness TO) in the region XE on the circumferential end portion side of the constant thickness portion M, and is minimum (thickness TI) at the radially inner end and is increased toward the radially outer end (thickness TO) in the region XC on the circumferentially central portion side of the constant thickness portion M.

It would be understood that, due to this configuration, the axial distance in the inclined flat surface portion 81*b* is minimum at the outer peripheral end of the half thrust bearing 8 and is increased toward the circumferentially central portion 85 side in any cross-section which is parallel with a plane containing both circumferential end surfaces 83.

Therefore, even when the change of the inclination of the thrust collar surface 12 relative to the rear surface 84*a* of the half thrust bearing 8 is generated as shown in FIGS. 13A to 13E, the contact position between the sliding surface 81 and the thrust collar surface 12 successively moves in the circumferential direction from the circumferential end portion (FIGS. 13A and 14A) of the half thrust bearing 8 on the rotation direction backward side of the crankshaft to the circumferential end portion (FIGS. 13E and 14E) on the rotation direction forward side of the crankshaft as shown in FIGS. 14A to 14E in accordance with the rotation of the crankshaft. Accordingly, in the half thrust bearing 8 of the embodiment, such a phenomenon that only the sliding surface 81 near both circumferential end portions comes into direct contact with the thrust collar surface 12 of the crankshaft all the time is prevented, and thus damage (seizure) is also prevented.

Further, the half thrust bearing 8 of the embodiment is formed so that, at any circumferential positions, the axial distance T of the inclined flat surface portion 81*b* is maximum at the radially inner end of the half thrust bearing 8 and is reduced toward the radially outer end in the region XE on the circumferential end portion 86 side of the constant thickness portion M as described above (see FIG. 6). Accordingly, in the plane containing both circumferential end surfaces of the half thrust bearing, even when the thrust collar surface 12 of the crankshaft is inclined with respect to the sliding surface 81 of the half thrust bearing 8 due to the deflection of the crankshaft generated during operation of the internal combustion engine, a region on an outer diameter side of the sliding surface 81 near both circumferential end portions of the half thrust bearing 8 is prevented from strongly coming into contact with the thrust collar surface 12 at any circumferential positions of the half thrust bearing 8.

Figure 7:
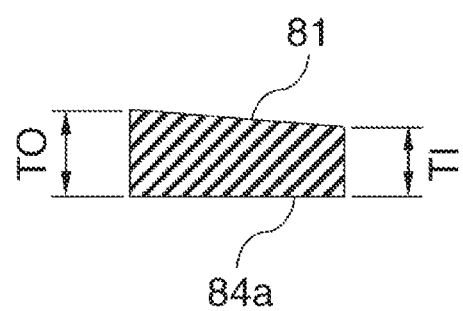
FIG. 7 is a cross-sectional view of the half thrust bearing in FIG. 2 taken along line A3-A3.

Furthermore, the half thrust bearing 8 of the embodiment is formed so that, at any circumferential positions, the axial distance of the inclined flat surface portion 81*b* is minimum at the radially inner end and is increased toward the radially outer end in the region XC on the circumferentially central portion side of the constant thickness portion M in which the axial distance is constant over the radial direction (see FIG. 7).

Accordingly, the oil flowing in a clearance (gap) between the inclined flat surface 81*c* and the thrust collar surface 12 in the region XC on the circumferentially central portion side of the constant thickness portion M during the operation of the internal combustion engine becomes hardly discharged to the radially outside of the half thrust bearing 8, and therefore an effective wedge oil film is easily formed in the flat surface portion 81*a* near the circumferentially central portion of the sliding surface. As a result, the thrust collar surface 12 is prevented from coming into contact with the neighborhood of the circumferentially central portion 85 of the sliding surface 81 hard, which may bring about large friction loss.

Figure 15A:
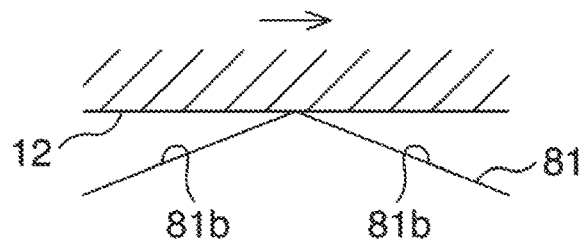
FIG. 15A is a cross-sectional view illustrating a contact state between the thrust collar surface and the sliding surface near a circumferentially central portion.
Figure 15B:
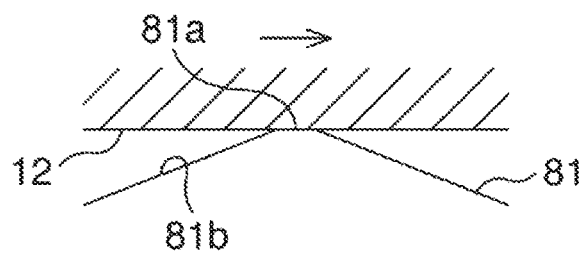
FIG. 15B is a cross-sectional view illustrating a contact state between the thrust collar surface and the sliding surface near a circumferentially central portion.
Figure 15C:
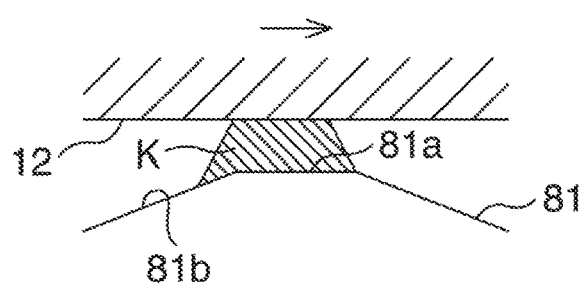
FIG. 15C is a cross-sectional view illustrating a contact state between the thrust collar surface and the sliding surface near a circumferentially central portion.
Figure 15D:
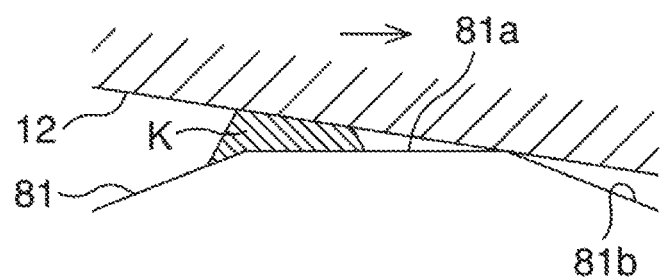
FIG. 15D is a cross-sectional view illustrating a contact state between the thrust collar surface and the sliding surface near a circumferentially central portion.

FIGS. 15A to 15D are cross-sectional views each illustrating a formation state of a wedge oil film K at the moment when the thrust collar surface 12 comes into contact with the sliding surface 81 near the circumferentially central portion which may have various shapes, and an arrow in each drawing illustrates the rotation direction of the crankshaft and thus the flowing direction of a fluid (lubrication oil). When the fluid is led into a portion between the two surfaces which are made narrow appropriately toward the front of the flowing direction of the fluid, a pressure is generated so that the wedge oil film K is formed. However, when the distance between the two surfaces becomes large toward the front, a mechanism which makes the oil film disappear is provided. In other words, the formation state of the oil film changes depending on the arrangement of the thrust collar surface 21 and the sliding surface 81. In the cases that the sliding surface 81 does not have a flat surface portion but is configured only by the inclined flat surface portions 81*b* as shown in FIG. 15A, and that the circumferential length of the flat surface portion 81*a* of the sliding surface 81 is less than a suitable range as shown in FIG. 15B, no effective wedge oil film is formed on the sliding surface 81 near the circumferentially central portion, so that the thrust collar surface 12 strongly comes into contact with the sliding surface 81 near the circumferentially central portion and the friction loss becomes large. On the contrary, when the flat surface portion 81*a* has a circumferential length within a suitable range as shown in FIG. 15C, the wedge oil film K is formed from the inclined flat surface portion 81*b* on the rotation direction backward side of the crankshaft over the entire flat surface portion 81*a*, which prevents the thrust collar surface 12 from strongly coming into contact with the sliding surface 81 near the circumferentially central portion and thus prevents large friction loss. However, when the circumferential length of the flat surface portion 81*a* exceeds a suitable range as shown in FIG. 15D, the wedge oil film K disappears on the rotation direction forward side of the flat surface portion 81*a*, so that the thrust collar surface 12 strongly comes into contact with the sliding surface 81 near the circumferentially central portion and the friction loss becomes large. Accordingly, in order to prevent the thrust collar surface 12 from strongly coming into contact with the sliding surface 81 and prevent the friction loss from becoming large, the circumferential length of the flat surface portion 81*a* needs to be within a suitable central angle θ, and the central angle θ is preferably 5° to 35°.

Embodiment 1 of the present invention has been described in detail above with reference to the drawings, however, it should be understood that the specific configurations are not limited to these embodiments, and the present invention can include design modifications which do not depart from the gist of the present invention.

For example, in embodiment 1, the bearing device 1 of a type in which the half bearing and the half thrust bearing are separated has been described, however, the present invention is not limited to this type, and is applicable to the bearing device 1 of a type in which the half bearing and the half thrust bearing are integrated.

Figure 16:
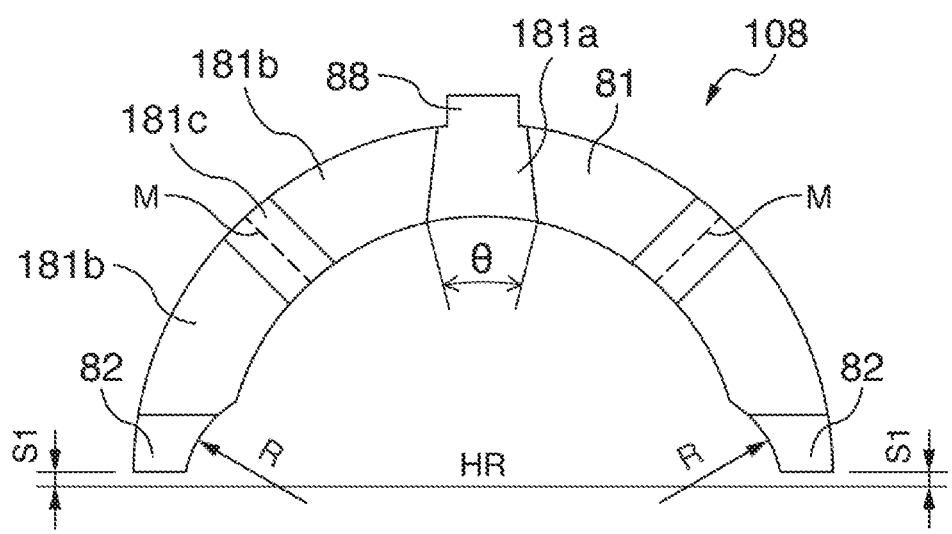
FIG. 16 is a front view of a half thrust bearing of another embodiment of the present invention.
Figure 17:
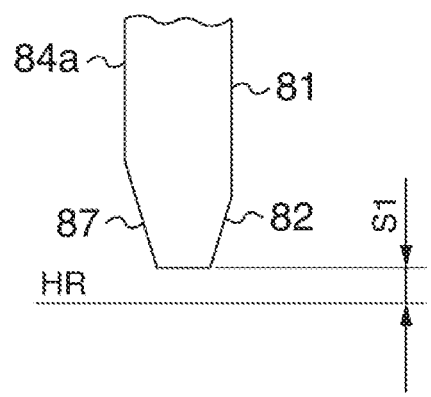
FIG. 17 is a side view of the half thrust bearing in FIG. 16 near a circumferential end portion.

Further, as shown in FIG. 16, the present invention is applicable to a half thrust bearing 108 with a protrusion 88 protruding outwardly in a radial direction for positioning and rotation prevention. It is to be noted that the protrusion 88 does not need to satisfy the configuration of the axial distance T described above. Further, as shown in FIGS. 16 and 17, thrust reliefs 82 are provided on the sliding surface 81 near both circumferential end portions of the half thrust bearing. In addition, as shown in FIG. 17, rear surface reliefs 87 may be also formed by providing tapers on both circumferential end portions of the rear surface 84a on the opposite side to the sliding surface 81 of the half thrust bearing 108. It is to be noted that when the thrust reliefs 82 or the rear surface reliefs 87 are provided, the bearing wall thickness TE at the radially outer end at both circumferential end portions of the half thrust bearing described above is defined as an axial distance between an imaginary sliding surface 81 (plane in which the sliding surface 81 is extended to the circumferential end portion) and an imaginary rear surface 84a (plane in which the rear surface 84a is extended to the circumferential end portion) that are obtained when the thrust reliefs 82 and the rear surface reliefs 87 are not provided.

Further, as shown in FIGS. 16 and 17, the half thrust bearing 108 is formed such that a circumferential length of the half thrust bearing 108 is shorter by a predetermined length S1 from a position HR of the circumferential end surfaces of the half thrust bearing 8 illustrated in embodiment 1. In addition, the half thrust bearing 108 is formed such that an inner peripheral surface near each of both circumferential end portions may be cut out in a circular arc shape with a radius R. In that case, the bearing wall thickness T at the circumferential end portions of the half thrust bearing can be expressed by a bearing wall thickness at the circumferential end portions of the half thrust bearing existing when the circumferential length of the half thrust bearing 108 is not made to be shorter by the length S1 and the cutout is not formed. Also in the half thrust bearing 108, the flat surface portion 181a is defined as a portion having a front shape which is surrounded by an inner peripheral portion defined by a circular arc at the radially inner end of the half thrust bearing 108, an outer peripheral portion defined by a circular arc at the radially outer end thereof, and two straight lines positioned on both circumferential sides thereof as shown in FIG. 16, and the circumferential length of the flat surface portion 181a is minimum at the outer peripheral portion of the half thrust bearing 108 (outer peripheral portion of the half thrust bearing 108 in the case that the protrusion 88 is not formed) and is gradually increased toward the inner peripheral portion. The circumferential lengths of the inner peripheral portion and the outer peripheral portion of the flat surface portion 181a are formed preferably to extend over a central angle of 5° to 35°.

Further, the half thrust bearing may also have chamfers along the circumferential direction at a radial direction outer edge and/or a radial direction inner edge on the sliding surface of the half thrust bearing. In that case, the bearing wall thickness TI at the radially inner end and the bearing wall thickness TO at the radially outer end of the half thrust bearing can be expressed by the bearing wall thicknesses at the radially inner end and the radially outer end of the half thrust bearing that exist if the chamfers are not formed.

The above embodiment relates to a half thrust bearing in which each of the inclined flat surface portions 81b, 181b includes one oil groove 81c, 181c, however, the present invention is not limited to those, and either one of the inclined flat surface portions may have an oil groove, or each of the inclined flat surface portions may have two or more oil grooves. Alternatively, an oil groove may be formed at a central angle of 45° so as to correspond to the constant thickness portion M as shown in FIG. 16.

Further, above embodiments have been described for the case where one bearing device uses four half thrust bearings, however, the present invention is not limited to this. The desired effect can also be obtained by using at least one half thrust bearing of the present invention. Alternatively, in the bearing device, the half thrust bearings of the present invention may be integrally formed with the half bearings on one or both axial end surfaces thereof that rotatably support the crankshaft.

The invention claimed is:

1. A half thrust bearing for receiving an axial force of a crankshaft of an internal combustion engine, the half thrust bearing having a semi-annular shape and comprising;
   a sliding surface for receiving the axial force; and
   a rear surface on an opposite side of the sliding surface, and the half thrust bearing defining a reference plane on a rear surface side that is perpendicular to an axial direction, wherein
   the sliding surface includes a flat surface portion extending in parallel with the reference plane from a radially inner end of the half thrust bearing to a radially outer end thereof, and two inclined flat surface portions formed on both sides in a circumferential direction of the flat surface portion,
   an axial distance between the reference plane and the sliding surface is maximum in the flat surface portion,
   at each of radial positions, the axial distance in each inclined flat surface portion is maximum at a circumferential end of the inclined flat surface portion on a circumferentially central portion side of the half thrust bearing and is reduced toward a circumferential end portion of the half thrust bearing,
   each inclined flat surface portion is arranged to form one constant thickness portion which extends linearly from the radially inner end to the radially outer end of the half thrust bearing in an area between central angles of 35° and 55° from the circumferential end portion toward the circumferentially central portion side of the half thrust bearing, the axial distance being constant in the constant thickness portion,
   in the circumferential direction, the axial distance is maximum at the radially inner end and is reduced toward the radially outer end in a region of each inclined flat surface portion between the constant thickness portion and the circumferential end portion of the half thrust bearing, and is minimum at the radially inner end and increases toward the radially outer end in a region of the inclined flat surface portion between the circumferentially central portion and the constant thickness portion, and
   the flat surface portion has a circumferential length extending over a central angle of 5° or more and 35° or less, at any radial positions of the half thrust bearing.

2. The half thrust bearing according to claim 1, wherein the rear surface is flat, and is positioned within the reference plane.

3. The half thrust bearing according to claim 1, wherein the flat surface portion includes the circumferentially central portion of the half thrust bearing.

4. The half thrust bearing according to claim 1, wherein the circumferential length of the flat surface portion is minimum at the radially inner end of the half thrust bearing and is gradually increased toward the radially outer end thereof, or is minimum at the radially outer end of the half thrust bearing and is gradually increased toward the radially inner end thereof.

5. The half thrust bearing according to claim 1, wherein when the half thrust bearing is viewed from a direction perpendicular to both circumferential end surfaces of the half thrust bearing, an outline of each inclined flat surface portion of the sliding surface is configured by a curved line.

6. The half thrust bearing according to claim 1, wherein a difference between the axial distance in the flat surface portion and the axial distance in both circumferential end portions at the radially outer ends of the half thrust bearing is 50 to 800 µm.

7. A half thrust bearing having a semi-annular shape including a first circumferential end portion and a second circumferential end portion, the half thrust bearing comprising:
a sliding surface configured to receive an axial force of a crankshaft; and
a rear surface on an opposite side of the sliding surface, wherein the rear surface is parallel to a reference plane on a rear surface side, wherein the reference plane is perpendicular to an axial direction of the half thrust bearing, wherein
the sliding surface includes:
 a flat surface portion extending, in parallel to the reference plane, from an inner circumference of the half thrust bearing to an outer circumference of the half thrust bearing,
 a first inclined flat surface portion formed at a first side of the flat surface portion in a circumferential direction of the half thrust bearing, and
 a second inclined flat surface portion formed at a second side of the flat surface portion in the circumferential direction of the half thrust bearing,
an axial distance between the rear surface and the sliding surface is maximum in the flat surface portion,
in the first inclined flat surface portion, the axial distance is maximum at a third circumferential end of the first inclined flat surface portion and decreases toward the first circumferential end portion of the half thrust bearing, wherein the third circumferential end is adjacent to the flat surface portion,
in the second inclined flat surface portion, the axial distance is maximum at a fourth circumferential end of the second inclined flat surface portion, and decreases toward the second circumferential end portion of the half thrust bearing, wherein the fourth circumferential end is adjacent to the flat surface portion,
the first inclined flat surface portion includes a first constant thickness portion which extends linearly from the inner circumference to the outer circumference, wherein the first constant thickness portion is located at a central angle in a range of 35° to 55° from the first circumferential end portion toward a circumferentially central portion of the half thrust bearing,
the second inclined flat surface portion includes a second constant thickness portion which extends linearly from the inner circumference to the outer circumference, wherein the second constant thickness portion is located at a central angle in a range of 35° to 55° from the second circumferential end portion toward the circumferentially central portion of the half thrust bearing,
in the circumferential direction, the axial distance is maximum at the inner circumference and decreases toward the outer circumference in a region between the first constant thickness portion and the first circumferential end portion of the half thrust bearing, and is minimum at the inner circumference and increases toward the outer circumference in a region between the first constant thickness portion and the first side of the flat surface portion,
in the circumferential direction, the axial distance is maximum at the inner circumference and decreases toward the outer circumference in a region between the second constant thickness portion and the second circumferential end portion of the half thrust bearing, and is minimum at the inner circumference and increases toward the outer circumference in a region between the second constant thickness portion and the second side of the flat surface portion, and
the flat surface portion has a circumferential length extending over a central angle of 5° or more and 35° or less, at any radial positions of the half thrust bearing.

* * * * *